United States Patent [19]

Bigney

[11] 3,841,651

[45] Oct. 15, 1974

[54] WHEEL MOUNTED, SUPPORT PLATFORM HAND TRUCK

[76] Inventor: Stephen W. Bigney, Spring Valley, Star Rt., Mayer, Ariz. 86333

[22] Filed: July 19, 1973

[21] Appl. No.: 380,705

[52] U.S. Cl. ............................................ 280/47.16
[51] Int. Cl. ............................................. B62b 7/02
[58] Field of Search ............... 280/47.16, 79.1, 79.3, 280/47.27; 214/383

[56] References Cited
UNITED STATES PATENTS

| | | | |
|---|---|---|---|
| 1,538,054 | 5/1925 | Ohnstrand | 280/47.16 X |
| 2,346,649 | 4/1944 | Bilek et al. | 280/47.27 X |
| 2,799,409 | 7/1957 | Kelly | 280/47.16 X |
| 3,744,812 | 7/1973 | Langhausen | 280/79.3 X |

*Primary Examiner*—Stanley H. Tollberg
*Assistant Examiner*—Norman L. Stack, Jr.

[57] ABSTRACT

The aspects of the invention disclosed herein are directed to a wheel mounted, support platform hand truck for carrying articles such as building sheet material from place to place. The wheel mounted, support platform hand truck is constructed of an elongated support plate formed of a rectangular channel member which is positioned with the U-shaped channel portion thereof facing downwardly to provide a smooth top surface upon which the building sheet material can be placed. A tubular frame member is secured to one side of the elongated support plate and extends upwardly therefrom a distance sufficient to allow building sheet material to be placed against the frame member and locked in position. The building sheet material is locked in position by a locking bar adjustably secured to a central vertical member of the frame, this locking bar being adjustably movable upwardly and downwardly and locked in position by a bolt or wing nut associated therewith. The locking bar includes a turned downwardly end portion to extend over the building sheet material and hold it firmly against the upstanding frame of the hand truck. A main wheel or roller member positioned beneath the central portion of the elongated support plate provides the primary support for holding up the weight of the building sheet material. However to facilitate turning of the hand truck about a pivot point provided by the central or primary wheel members, a pair of secondary wheel members are positioned at the ends of the elongated support plate. The longitudinal axis through these secondary wheels are positioned slightly above the floor surface when the elongated support plate is horizontal to allow the entire wheel mounted, support platform hand truck to be tilted about the primary wheels and turned easily.

2 Claims, 5 Drawing Figures

PATENTED OCT 15 1974　　　　　3,841,651
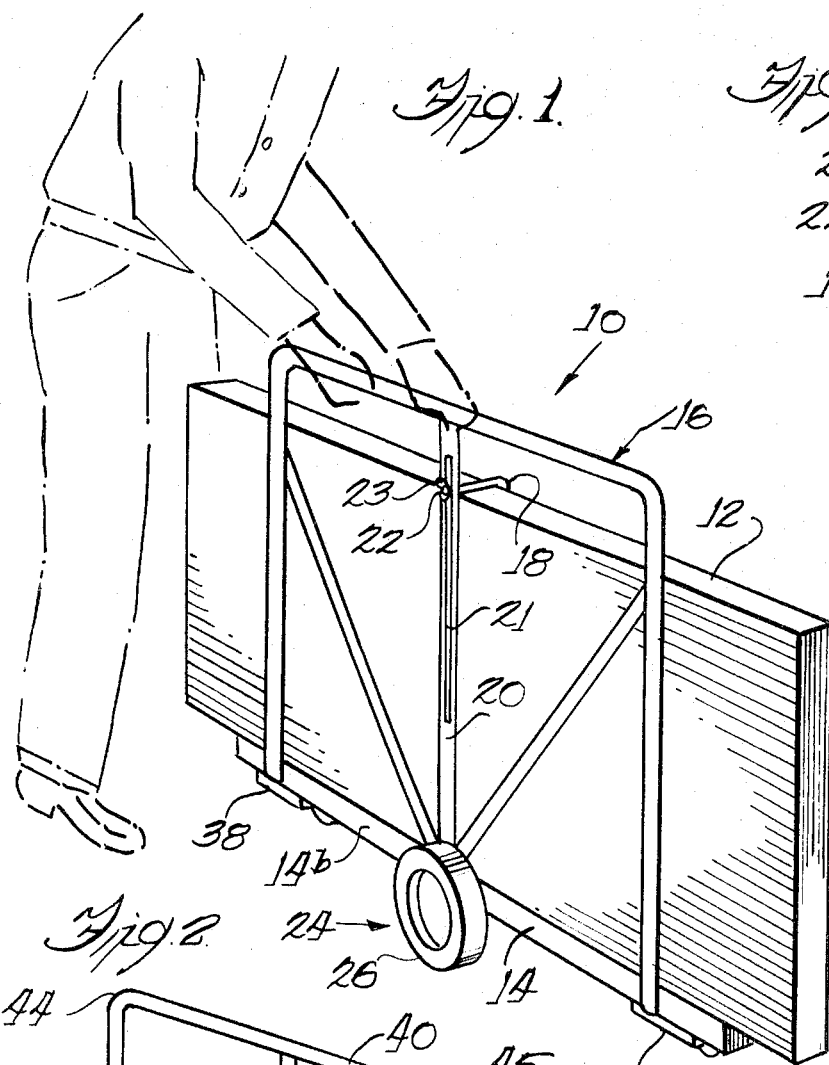
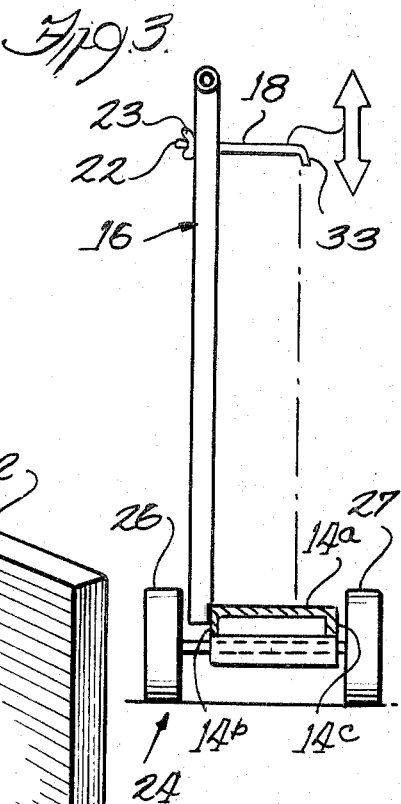
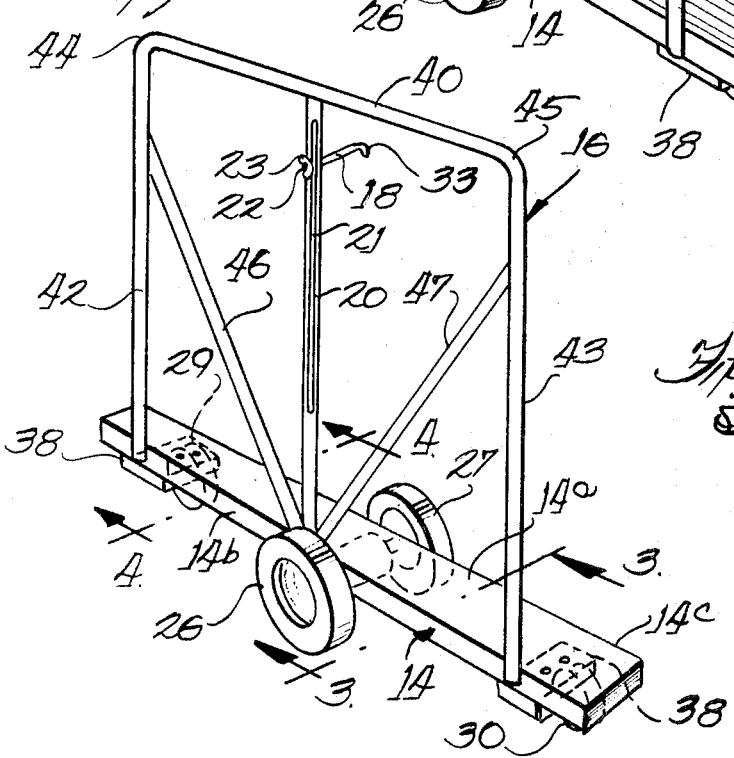
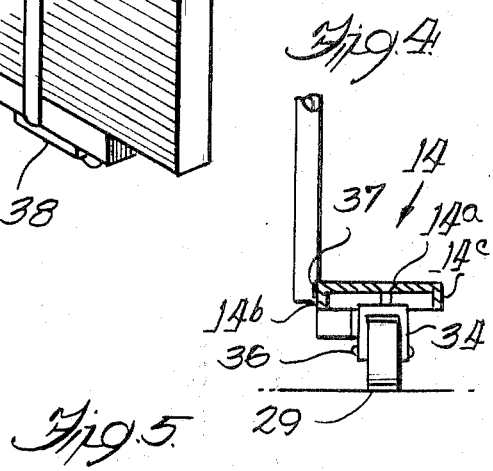
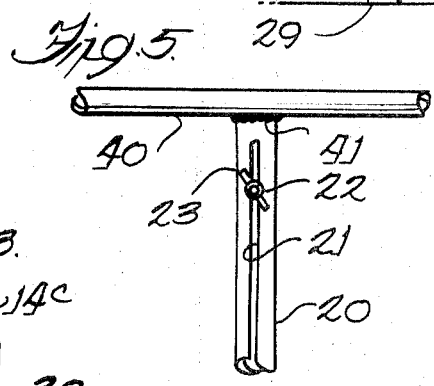

WHEEL MOUNTED, SUPPORT PLATFORM HAND TRUCK

BACKGROUND OF THE INVENTION

1. Field of the Invention

This invention relates generally to improvements in structures and apparatus used primarily in the field of moving building sheet material at a work site, and more particularly to the construction of an improved wheel mounted, support platform hand truck for carrying building sheet material, such as plywood, dry wall, and the like. However, it will be understood that while this invention is directed particularly to devices used in the field of transporting building sheet material, the specific device disclosed herein may be used in other allied fields, such as carrying other large relatively thin objects such as heavy pictures, signs, and the like.

2. Description of the Prior Art

Heretofore hand trucks have been provided for facilitating movement of heavy loads by one or two workmen, which heavy loads may constitute such things as building sheet material, and the like. It is common practice to transport such articles in packages or bundles, and a wheeled dolly or truck is used to facilitate handling the heavy sheet material on the work site. However, hand trucks for this purpose heretofore utilized are relatively complicated and expensive for the purpose intended. For example, one such hand truck provides a tubular structure having a bottom member formed of angled brackets and secured to a correspondingly angled upstanding frame member so that articles can be carried while substantially in a vertical incline. This type of structure is equipped with four castor rollers at four spaced apart quadrant locations to facilitate rolling the heavy load placed thereupon over a floor surface. The relative cost of castors of the high quality needed for transporting heavy loads substantially increases the general overall cost of the hand truck.

Still another type of hand truck is one similar to the type described above but which includes a pair of hook members formed at the bottom to allow the hand truck to be used somewhat as the dolly lift, which can be manipulated so the hook members are slid or fitted under the article to be carried. The entire hand truck is then arcuately manipulated rearwardly to lift the article from the floor and onto the hook members in a well known manner. Here again, this type of hand truck is relatively expensive and complicated to manufacture. One particular disadvantage is that it requires relatively expensive turnable castor wheels located at four spaced apart quadrant locations to facilitate maneuvering the hand truck while transporting the material thereon.

Still further prior art type hand trucks which can be used for carrying heavy loads of building sheet material is one wherein the truck is formed of a wood frame structure and has interchangable walls which can be inserted into slots formed along various locations of the bottom portion of the hand truck. While this type of hand truck has a particular utility when used for carrying large sheets of glass, it is relatively expensive to manufacture. The entire frame is fabricated of wood members which must be manually fabricated to form the hand truck.

Still another type of prior art device used to transport large weights of building sheet material is one wherein a small roller bar is utilized. The roller bar has an edge support member formed at the lower end thereof, and which edge support member is equipped with wheels. The building sheet material therefore has the edge thereof placed on the edge support member of the bar and then the roller bar and the building sheet material are moved from site to site. While this particular structure is relatively inexpensive, as compared to the others, it requires that the operator at all times keep one hand on the roller bar and the other hand on the building sheet material to keep it from falling off. This is a distinct disadvantage in that the operator may be required to perform another task in the interim of transporting the building sheet material. If this is the case he must discontinue transporting of the building sheet material by taking it off the roller bar and placing it in a safe place. This is a waste of time and therefore causes the expense of handling such building sheet material to increase.

SUMMARY OF THE INVENTION

Accordingly, it is a feature of this invention to provide a wheeled mounted, support platform hand truck which substantially completely overcomes all of the disadvantages associated with the prior art types of hand trucks for handling building sheet material, but which does not in any way detract from any of the already obtained advantages of such hand trucks and in fact increases the number of advantages by the utilization of a novel structural arrangement of the components as set forth herein.

A primary feature of this invention is the provision of a wheel mounted, support platform hand truck which utilizes an elongated support plate formed of a U-shaped channel member. The U-shaped channel member has the smooth surface thereof extending upwardly and upon which the edge of building sheet material may be placed. A frame member is secured to the elongated support platform along one side thereof and extends upwardly from the platform a distance sufficient to allow building sheet material to be held firmly in position. To facilitate the holding of the building sheet material a locking bar is adjustably secured to the frame member. This locking bar is vertically movable on the frame member and locks in place thereon by such means as a bolt, and wing nut arrangement, or the like.

Another feature of this invention is to provide a novel wheel mounted support platform hand truck for carrying articles such as building sheet material wherein the elongated support platform is provided with a main roller member mounted beneath the elongated support platform and substantially centrally of the length thereof, this main roller member providing means to enable easy transport of the entire hand truck from place to place, and further including a secondary pair of roller members secured to the end sections of the elongated support platform. The secondary rollers are used to provide rolling support of the hand truck as it is transported but which allows the entire hand truck to pivot about the primary rollers. By so allowing the hand truck to pivot about the primary rollers the entire hand truck, including the load secured thereto, can be rotated about the pivot point above the primary wheels for easily turning the same.

Another feature of this invention is the provision of a wheel mounted, support platform hand truck for carrying articles such as building sheet material wherein the elongated support platform is formed substantially of a rectangular member and wherein the support frame extending upwardly therefrom is formed of tubular fabricated members.

Another feature of this invention is the provision of a new and novel wheel mounted, support platform hand truck for carrying articles such as building sheet material wherein the locking means associated with the support frame has a hook portion associated therewith, which hook portion extends across the elongated support platform a distance sufficient to extend over and catch the free side of the building sheet material to be secured thereto.

Still another feature of this invention is the provision of a novel wheel mounted, support platform hand truck for carrying articles of building sheet material wherein the frame member includes a centrally located upstanding tubular section through which is formed an elongated slot vertically positioned relative to the hand truck. The locking member has a threaded shank portion thereof extending through the elongated vertical slot and thereby provides means for locking the locking member in a particular vertical position above the support platform. Therefore building sheet materials of different size can be placed in position on the elongated platform and secured thereto, this being true within predetermined limits.

Still another feature of this invention is the provision of a novel wheel mounted, support platform hand truck for carrying articles of building sheet material wherein the main roller members are formed of a pair of wheels located at the sides of the elongated support plate and wherein the radius of the wheels is such as to cause the wheels to extend above the top surface of said elongated support plate.

Another feature of this invention is the provision of a novel wheel mounted, support platform hand truck for carrying articles of building sheet material wherein the distance of the axis passing through the primary roller members from the elongated support platform is greater than the distance of the axis of the secondary roller members extending from the elongated support platform thereby providing means for allowing the entire wheel mounted support platform hand truck to be rocked or tilted about the primary wheel members to facilitate turning of the entire hand truck.

Still another feature of this invention is the provision of a wheel mounted, support platform hand truck for carrying articles of building sheet material wherein the frame member thereof is constructed of tubular stock and wherein a U-shaped member is formed having the bight portion thereof located at the top of the frame member and the open free ends thereof depending downwardly and secured to the elongated support platform at one side thereof to facilitate carrying of the building sheet material, and the like.

Briefly, the wheel mounted, support platform of this invention is equipped with the necessary retaining and mounting brackets whereby transportation of building sheet material can be made more efficient and safer. The basic platform would be rectangular in shape and have overall dimensions of approximately 60 inches long by 12 inches wide, these dimensions being changeable as desired. A set of two 8 inch diameter wheels are centrally located on each side of the platform and they are supported by a bearing mounted axle. Additional equipment includes a frame work which extends vertically on one side of the platform to a height of approximately 52 inches, more or less. This frame work is comprised of three vertical columns, equally spaced, as well as a horizontal cross piece on the top portion thereof. Additional cross braces are provided in order to allow for a very durable and stable structure. The center vertical column is afixed with slidable mounted holding brackets and its height can be adjusted by means of a threaded fastener. Additional equipment includes attachment of two bumper castors near the endmost sections of the platform. It is the purpose of these wheels to limit the motion of the platform about the primary wheels.

In the use of the wheel mounted support platform hand truck of this invention the appropriate slab or piece of building sheet material is lifted and positioned on the platform of the truck, so that it can be balanced on the central axle wheel. The slidable bracket is lowered to come in contact with the top portion of the building sheet material, thereby providing an arm for holding the building sheet material in place. One man can then maneuver one or more pieces of building sheet material simply by pulling or pushing the hand truck of this invention. Because of the incorporation of the castor wheels at the front and rear sections of the hand truck, the danger caused by accidental tipping of the hand truck is substantially completely eliminated, and actual manipulation of the hand truck over any encountered terrain is substantially facilitated.

Many other features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is a perspective view of a wheel mounted, support platform hand truck constructed in accordance with the principles of this invention and illustrating a plurality of building sheet material placed in position thereupon to be transported from one site to another site by a workman;

FIG. 2 is a perspective view of the hand truck of FIG. 1, but without building sheet material positioned thereon to illustrate the details of structure;

FIG. 3 is an end sectional view of the hand truck of this invention taken substantially along Line 3—3 of FIG. 2;

FIG. 4 is an end fragmentary sectional view of the hand truck of this invention taken substantially along Line 4—4 of FIG. 2; and FIG. 5 is a detailed fragmentary view illustrating the elongated slot through which the locking bar is secured for holding the building sheet material firmly in place on the hand truck of this invention.

DESCRIPTION OF THE PREFERRED EMBODIMENT

Referring now to the drawings a wheel mounted, support platform hand truck is constructed in accordance with the principles of this invention, and is here designated generally by reference numeral 10. The wheel mounted, support platform hand truck is used for carrying articles such as building sheet material 12, here illustrating a plurality of such sheets, stacked side by side and secured to the hand truck for transport. The building sheet material 12 is placed in position upon an elongated support plate 14 which is preferably formed of a U-shaped channel member which has the bight portion thereof forming the top surface 14a upon which the building sheet material 12 rests, as best seen in FIGS. 2 and 3. The elongated support plate 14 has first and second elongated side portions 14b and 14c. A vertical frame member 16 is secured to the elongated side portions 14b, as for example by welding, riveting, bolting, screwing, or any other suitable fastening technique known in the art. The vertical frame member 16 is secured only to one of the elongated side members so as to allow a substantial free space 14a upon which the building sheet material can be placed. The frame member extends upwardly from the elongated support plate 14 a distance sufficient to allow the building sheet material to be transported thereby and wherein the building sheet material has the upper edge thereof resting against the frame member.

A locking bar 18 is adjustably secured to the frame member 16. In the preferred embodiment the locking bar 18 is secured to a vertical guide member 20 centrally located within the frame member 16 and which vertical member 20 has an elongated slot 21 formed therein. The locking bar has an end portion 22 extending through the vertical slot and includes a wing nut 23 for locking the bar in a fixed position on the vertical member 20 to hold the building sheet material in place. The locking bar is placed at the desired location within the wing nut 23. A main or primary roller member 24 is located beneath the elongated support plate 24 and substantially centrally thereof. The main primary roller member 14 provides means upon which substantially all of the weight of the building sheet material is supported. Preferably, the main or primary roller member 24 includes a pair of spaced apart wheels 26 and 27 which have a diameter of approximately 8 inches and thereby have the top portions of the wheels extending above the surface of the elongated support plate 14. By providing relatively large wheels the heavy weight of the building sheet material is moved with ease.

Secondary roller members 29 and 30 are formed at the ends of the wheel mounted support platform hand truck 10 are and used substantially to balance the hand truck during pulling or pushing the same. Preferably, the axis of the secondary wheels 29 and 30 is at a location beneath the elongated support plate 14 a distance less than the axis which passes through the main or primary support wheels 26 and 27. Therefore the entire wheel mounted, support platform hand truck will pivot somewhat about the axis passing through the primary wheels and occasionally the front and rear or end secondary wheels 29 or 30 will alternately engage the surface upon which the structure is moved.

In the illustrated embodiment, the elongated support platform 14 is here preferably formed of an elongated channel member which is substantially rectangular in configuration. However, it will be understood that other configurations of the bottom support plate can be constructed of a tubular member if desired.

As best seen in FIG. 3, the locking bar 18 is provided with a turned downwardly end portion 33 which forms a hook or lock member fitting over the top peripheral edge of the building sheet material. This hook facilitates ease of locking and unlocking or securing and unsecuring the building sheet material. It merely need be turned upwardly out of the way to allow building sheet material to be removed from the hand truck.

As best seen in FIG. 4, the secondary roller member 29 is shown secured to a U-shaped depending wheel mounting bracket 34 through which the axle 36 passes to rotatably support the roller 29. Also seen in FIG. 4 is a weld connection 37 which forms a means to secure the frame 16 to the elongated side portion 14b of the platform or plate 14. As best seen in FIG. 2, the U-shaped wheel receiving bracket 34 may be secured to a reinforcing portion 38 located at each end of the elongated support plate and which portions 38 add a thickness to the channel member for receiving mounting bolts or screws.

Seen in FIG. 5 are some of the details of construction of the frame member 16 with regard to the central vertical portion 20 and the elongated slot 21 formed therein. The frame member 20 has the top or bight portion 40 thereof provided with a weld bead at the connection thereof with the vertical member 20, this weld bead here being illustrated by reference numeral 41. The bight portion 40 is integrally formed with downwardly turned ends 42 and 43 which extend from the radius members or portions 44 and 45, respectively, as best seen in FIG. 2. To provide additional strength for the frame member, angled upwardly diverging pipe members 46 and 47 are provided. The diverging pipe members 46 and 47 are secured together at the base of the vertical member 20 and preferably welded together at a single point.

The wheeled mounted, support platform truck of this invention as illustrated herein is light in weight, easy and inexpensive to manufacture, and extremely efficient and reliable in use. Therefore, variations and modifications of this invention may be effected without departing from the spirit and scope of the invention as set forth in the following claims.

Having thus described the invention, what is claimed is:

1. A wheel mounted, support platform hand truck for carrying articles, such as building sheet material, comprising in combination:

an elongated support plate forming a carrying surface of said wheel mounted, support platform hand truck, said elongated support plate being a channel having first and second elongated side portions depending therefrom, a frame member secured to said first elongated side portion of said elongated support plate, said frame member extending upwardly from said elongated support plate a distance sufficient to allow building sheet material to be transported thereby to have the upper edge thereof rest against said frame member, a primary journalled roller member secured beneath said elongated support plate with the journal axis perpendicular to the sides of and substantially centered along the length of said elongated support plate, said primary roller member comprising a pair of wheels disposed on opposite sides of said support plate, thereby providing means to enable the transport of said wheel mounted, support platform hand truck from place to place, and a terminally-hooked locking bar adjustably secured to a vertically-slotted elongated guide member which is secured to said frame member and to said first elongated side portion of said support plate with the slot being in a vertical position substantially directly above said primary roller member when said elongated support plate is horizontal, said locking bar being vertically movable in the slot of said slotted guide member and adapted to be locked in place at the desired elevation to hook the building sheet material and thereby hold it firmly in place on the elongated support plate and against said frame member, a pair of spaced secondary roller members secured beneath said elongated support plate and located substantially at the terminating ends of said elongated support plate, the lowermost points of said secondary roller members being higher than the lowermost point of said primary roller member when the carrying surface of said elongated support plate is horizontal above a floor surface on which said primary roller member rests, said secondary roller members providing means for maintaining said wheel mounted, support platform hand truck in an easily balanced condition while moving a quantity of building sheet material secured thereto.

2. The wheel mounted, support platform hand truck for carrying articles of building sheet material, as set forth in claim 1 wherein said frame member is constructed of a tubular fabricated unit of U-shape having the bight portion thereof forming the top of the frame member, and the open end portions extending downwardly to said elongated support plate where they are welded to the outside edge of said first elongated side portion of said elongated support platform, said frame member further including a pair of support braces extending upwardly and diagonally, said support braces being two in number and positioned on opposite sides of the slotted guide member to which said locking bar is adjustably fastened, said support braces having their lower ends brought together and welded to said first side portion of said elongated support plate substantially in registry over said primary roller member and diverging upwardly therefrom to be secured to the U-shaped tubular frame member near the top portion thereof.

* * * * *